July 3, 1928.
D. W. OHAVER
1,675,766
AUTOMOBILE HEADLIGHT
Filed Sept. 7, 1926
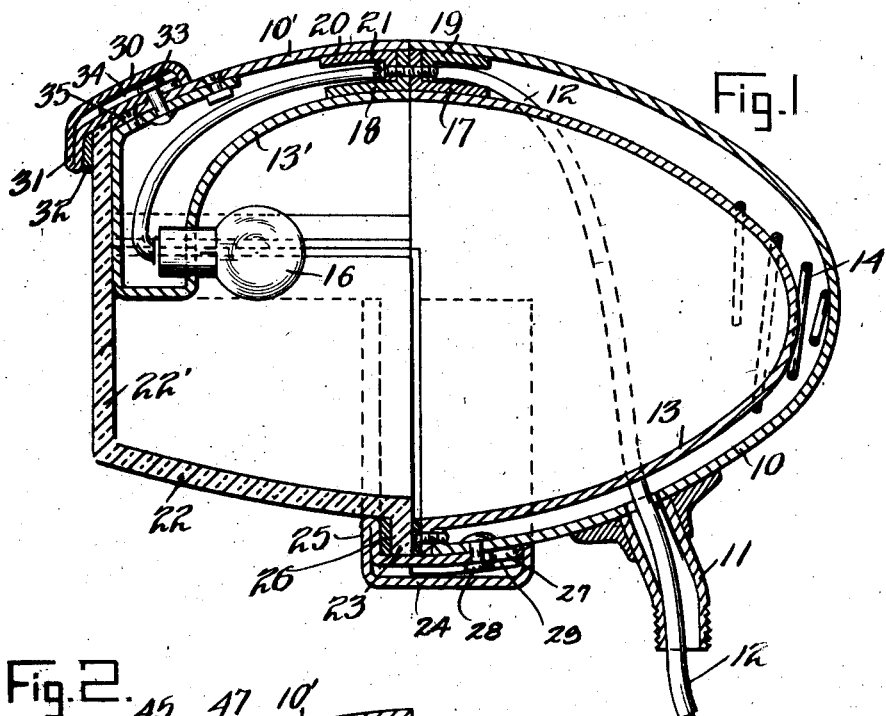
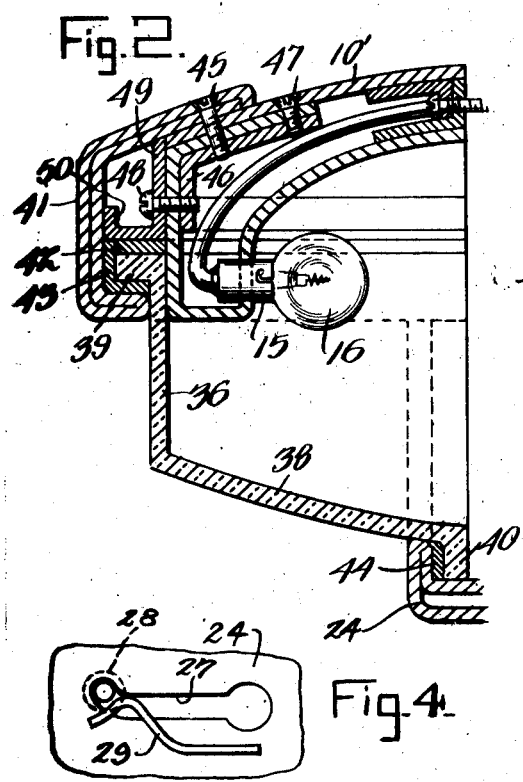
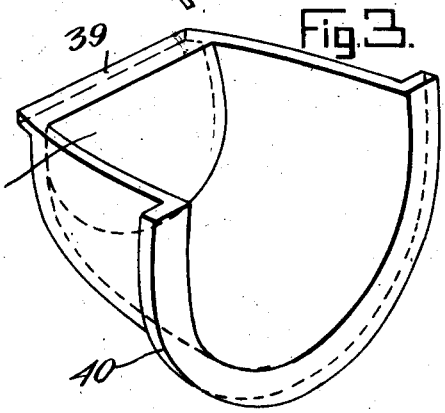
Inventor
David W. Ohaver Patented July 3, 1928.

1,675,766

UNITED STATES PATENT OFFICE.

DAVID W. OHAVER, OF ROCKVILLE, INDIANA.

AUTOMOBILE HEADLIGHT.

Application filed September 7, 1926. Serial No. 134,047.

My said invention relates to automobile headlights and it is an object of the same to provide a headlight which will illuminate the roadway ahead of and to the sides of a vehicle without glaring or blinding the eyes of the driver of an approaching vehicle.

Referring to the accompanying drawings which are made a part hereof and on which similar reference characters indicate similar parts, Figure 1 is a central longitudinal vertical section, Figure 2, a similar fragmentary view of a modified form of the invention, Figure 3 a perspective of a lens used in Figure 2.

Figure 4 is a fragmentary detail of the bayonet slot in one of the fastening elements in Fig. 1.

In the drawings reference character 10 indicates a casing or shell having a hollow support 11 for attachment to a part of the vehicle and through which one or more conductors 12 extend. This shell 10 is preferably parabolic in form and a reflector 13 of similar shape is adapted to be mounted within the same. A coiled spring 14 is disposed between the reflector and its casing, the forward end of said spring being attached in any desired manner, as for example by welding to the reflector, as shown. The parts just described constitute substantially one-half of the headlight, there being a casing 10' which conforms to the outer portion of the casing 10 but is substantially semi-circular and is held by the shell or casing 10 above a horizontal plane extending through the center of the headlight. A reflector 13' extends forwardly and downwardly from the reflector 13 and is upturned at its forward edge in spaced relation to the downwardly extending portion of the same to form a support for the shell 10' and for the forward portion of the headlight lens.

Adjacent the lower edge of the downwardly curved portion of the reflector 13' is mounted a socket 15 to which is connected the conductor 12, said socket being of conventional form for the reception of a conventional lamp or light bulb 16. The contiguous edges of the reflectors 13 and 13' are provided with a plurality of similarly located brackets 17 and 18 for cooperation with similar brackets 19 and 20 secured on the contiguous edges of the shells 10 and 10' and screws 21 are provided, said screws being threaded through said brackets for fastening the parts together.

A lens 22 of substantially the shape shown in Figure 3, but having its forward portion extending upwardly and forming a complete circular lens portion, is provided, said lens having a forwardly upstanding portion 22' and a semi-circular flange 23 corresponding to that shown in Figure 3. The lens 22 may be held in position by means of a retaining element or rim 24 which is also preferably semi-circular in shape and provided with an inturned lip 25 for engagement with the external flange 23 of the lens. If desired a gasket 26 of felt or other desirable material may be applied between the lens and the lip 25 for preventing the breaking of the lens by its holding means. The retaining or fastening element 24 is preferably provided with a slot 27 extending transversely of the same or longitudinally of the headlight for the reception of a rivet or flat-headed bolt 28 and a spring 29 is preferably provided for resiliently constricting the slot 27 so that when the retaining member 24 is applied and forced longitudinally the spring will yieldingly permit the pin or bolt 28 to pass the same and to be held in the end of the slot until the same is removed by a reverse operation.

A retaining element 30 similar to the retaining element or rim 24 is provided for engaging the upper portion of the lens and for yieldingly supporting the same in position, said retaining element having a depending lip 31 between which and the lens a gasket 32 may be applied. The retaining element 30 is also provided with a transverse slot, similar to the slot 27 in the retaining element 24 which extends longitudinally of the headlight and a pin or rivet 33, similar to rivet 28, is carried by the casing 10', the end of which is adapted to slide along the slot past a spring 34, similar to spring 29, which will resiliently hold the same in position. Screws 35 are provided for securing the upper forwardly extending portions of the casing and reflector together.

In lieu of the forward portion of the reflector which comprises the casing 10', reflector 13' and the parts asociated therewith, the structure may be modified, as shown in Figure 2 and the upright portion of the lens which projects upwardly beyond the plane upon which the light is mounted is dispensed with and the type of lens shown in Figure 3 is employed, said lens having a forward upstanding portion 36 and a rearwardly extending portion 38 with a forward horizontal flange 39 and a rear semi-circular flange 40, said flanges being adapted to be engaged by retaining rims 41 and 24 which are similar to those shown in Figure 1, it being obvious that gaskets 42, 43 and 44 may be applied for preventing direct contact with the retaining rims and the lens to prevent breakage of the same. The retaining element 41 is held in position by means of one or more screws 45 which extend through the casing 10' and into a reenforcing bracket 46 which bracket is also held in position by screws 47 and 48, the screw 48 being inserted through the forward vertical portion of the reflector and also through a bracket 50 which forms a support for the retaining rim 41.

If desired the forward section of my light may be applied to a conventional headlight having a parabolic reflector. With the structure shown the light from the bulb 16 will shine directly on the reflectors and will be projected directly downwardly to the sides of the light as well as forwardly by the rear portion of the reflector but such forward reflection will not be in the proper relationship to the bulb to throw out a blinding glare.

It will be obvious to those skilled in the art that various changes may be made in my device without departing from the spirit of the invention, and therefore I do not limit myself to what is shown in the drawings and described in the specification but only as indicated in the appended claims.

Having thus fully described my said invention, what I claim as new and desire to secure by Letters Patent is:

1. The combination with a headlight having an outer casing and a curve parabolic reflector spaced from the walls of said casing, of a curved, detachable, overhanging forward casing, a similarly arranged curved reflector disposed in spaced relation in said forward casing, said detachable casing and reflector terminating in a horizontal plane passing through the longitudinal axis of the parabolic reflector, a lens for said overhanging portion comprising an upright portion on the front end of the lens and a portion extending rearwardly therefrom to the main portion of the headlight for permitting light to shine directly downwardly through the same, and a source of light supported in the forward portion of the overhanging parabolic reflector, substantially as set forth.

2. The combination with a headlight having an outer casing and a curved parabolic reflector spaced from the walls of said casing, of a curved, detachable, overhanging forward casing, a similarly arranged curved reflector disposed in spaced relation in said forward casing, said detachable casing and reflector terminating in a horizontal plane passing through the longitudinal axis of the parabolic reflector, a lens for said overhanging portion comprising an upright portion on the front end of the lens and a portion extending rearwardly therefrom to the main portion of the headlight for permitting light to shine directly downwardly through the same, a source of light supported in the forward portion of the overhanging parabolic reflector and conductors extending from said source of light between said spaced reflectors and casings, substantially as set forth.

In witness whereof, I have hereunto set my hand at Indianapolis, Indiana this 3rd day of September, A. D. nineteen hundred and twenty-six.

DAVID W. OHAVER.